June 8, 1937.   W. A. NORRIS   2,082,899
RADIATOR
Filed Nov. 13, 1935   2 Sheets-Sheet 1
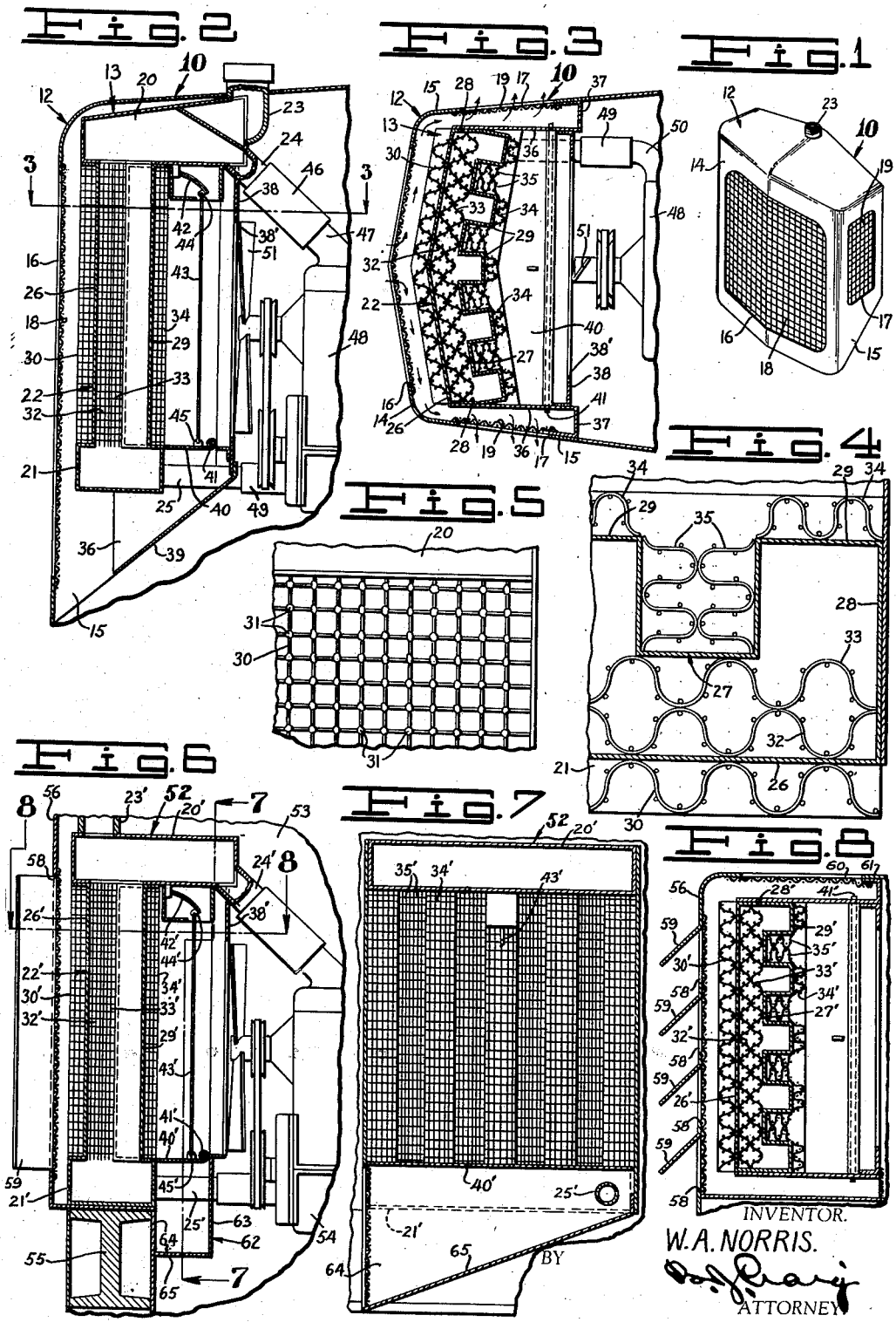
INVENTOR.
W. A. NORRIS.
ATTORNEY June 8, 1937.  W. A. NORRIS  2,082,899
RADIATOR
Filed Nov. 13, 1935  2 Sheets-Sheet 2
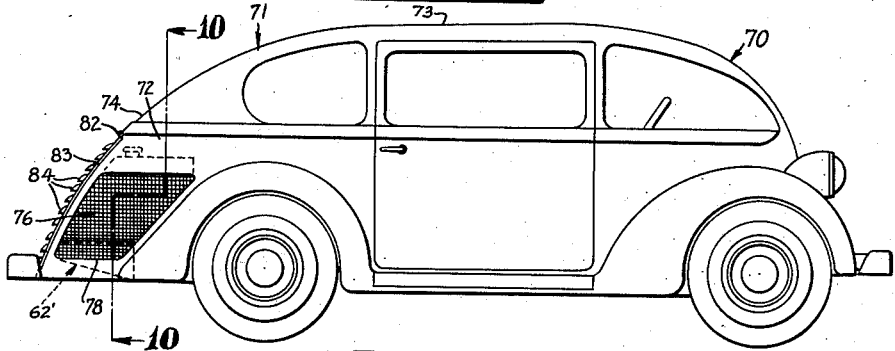
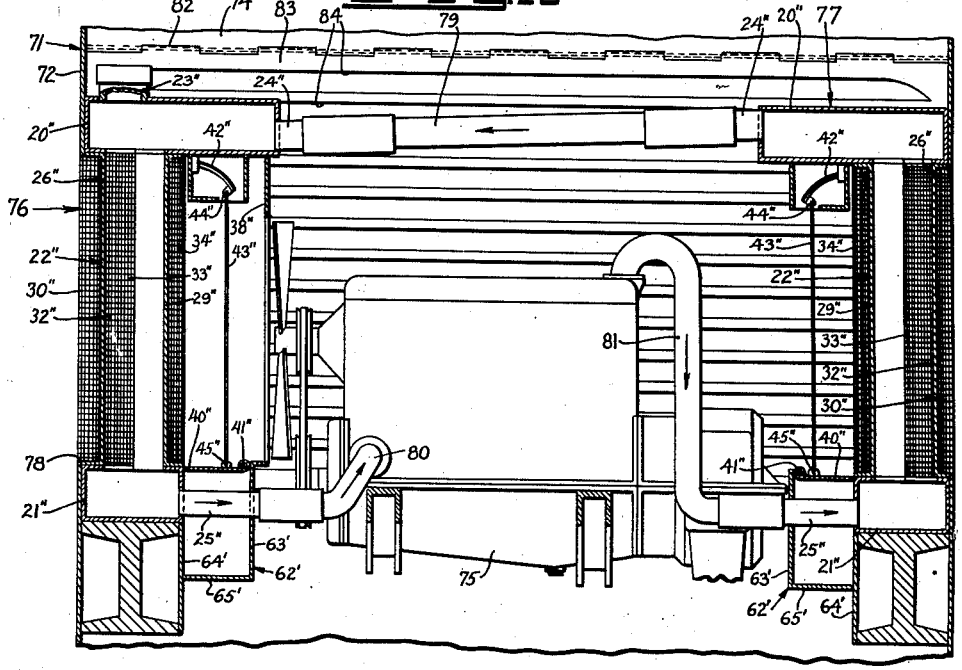
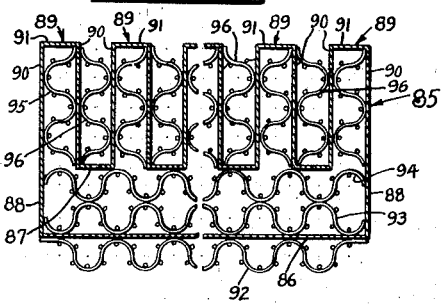
INVENTOR.
W. A. NORRIS.
BY
ATTORNEY.

Patented June 8, 1937

2,082,899

UNITED STATES PATENT OFFICE 2,082,899

RADIATOR

William A. Norris, Alhambra, Calif.

Application November 13, 1935, Serial No. 49,470

9 Claims. (Cl. 257—130)

This invention relates to improvements in automobile radiators.

The general object of this invention is to provide an improved radiator for use in combination with a water cooled automobile engine.

Another object of the invention is to provide a radiator structure wherein before the engine heats to a predetermined degree, cooling air circulates only on the front and sides of the radiator and whereafter, when the engine heats to a predetermined degree, automatically operated means is provided to allow cooling air to circulate over the rear of the radiator.

A further object of the invention is to provide a radiator including upper and lower tank portions with an intermediate box-like conduit portion communicating with said tanks, and wherein the intermediate portion has a wire mesh therein which engages the front and back walls of the intermediate portion, and wherein the intermediate portion has wire mesh secured to the outer surfaces of the front and back walls.

Other objects and the advantages of this invention will be apparent from the following description taken in connection with the accompanying drawings, wherein:

Fig. 1 is a perspective view of my improved radiator;

Fig. 2 is an enlarged fragmentary longitudinal section through an automobile showing my improved radiator operatively connected to the automobile engine;

Fig. 3 is a section taken on line 3—3 of Fig. 2;

Fig. 4 is an enlarged fragmentary view similar to Fig. 3;

Fig. 5 is a fragmentary face view of Fig. 4;

Fig. 6 is a view of a radiator similar to Fig. 2 showing a modified form of installation;

Fig. 7 is a section taken on line 7—7 of Fig. 6;

Fig. 8 is a section taken on line 8—8 of Fig. 6;

Fig. 9 is a view of an automobile showing my improved radiator operatively connected to another type of automobile engine;

Fig. 10 is a section taken on line 3—3 of Fig. 9; and

Fig. 11 is a sectional view of a modified form of my improved radiator.

Referring to the drawings by reference characters I have indicated my improved radiator generally at 10.

As shown the radiator includes an outer shell portion 12 and a core portion 13. The shell portion 12 includes a front wall 14 and side walls 15 and is adapted to form the front portion of an automobile the same as the present radiator shells.

The front wall 14 of the shell has an aperture 16 therein and the side walls 15 each have an aperture 17 therein. On the inner side of the shell a wire mesh screen 18 is provided over the front aperture 16 and similar wire screens 19 are provided over the side apertures 17. The core member 13 includes an upper tank portion 20 and a lower tank portion 21 and an intermediate conduit portion 22.

The upper tank 20 has a filling conduit 23 and a return conduit 24, both communicating with the interior thereof. The lower tank 21 has an outlet conduit 25 communicating with the interior thereof. The intermediate portion 22 includes spaced front and rear walls 26 and 27 and end walls 28.

The front wall 26 of the intermediate portion 22 is shown as plain, while the rear wall 27 is formed with a plurality of vertically extending crenelations 29.

At its upper end the interior of the intermediate portion 22 communicates with the interior of the upper tank 20, and at the lower end the interior of the intermediate portion 22 communicates with the interior of the lower tank 21.

Positioned on the front wall 26 of the intermediate portion 22 I provide a wire mesh member 30 which is formed in a serpentine shape. The wire mesh member 30 is of the type wherein the vertical and horizontal strands thereof are soldered together at their junctions, as indicated at 31. (See Fig. 5.) The member 30 may also be made of expanded metal if desired.

Positioned in the intermediate portion 22, between the front and back walls 26 and 27 thereof I provide a pair of wire mesh members 32 and 33 which are formed in a serpentine shape similar to the member 30. The front interior mesh 32 is positioned so that the outward curved portions thereof extend vertically and contact the front wall 26 in the same line as the rear curved portions of the member 30 contact the front wall 26, and the member 33 is positioned so that the forwardly curved portions thereof contact the rear curved portions of the member 32, and the rear curved portions of the member 33 contact the rear wall 27.

Positioned against the outer surface of the rear walls of the crenelated portions 29 I provide wire mesh members 34 which are formed similar to the member 30 and on the outer surfaces of the side walls of the crenelated portions I provide wire mesh members 35 which are likewise formed similar to the member 30. When constructing the core member 13, all the surfaces of the intermediate portion 22 are tinned, and after the wire mesh members 30, 33, 34, and 35 are placed in position the intermediate portion is heated to a predetermined degree which melts the soldered joints 31 of the wire mesh 30. The melted solder engages the walls of the intermediate portion and securely fastens the wire meshes to the intermediate portion when cool.

The core member 13 is positioned in the shell 12 with the front wall 26 thereof spaced from the front of the shell and the sides 28 thereof spaced from the sides 15 of the shell. The shell 12 in the interior thereof adjacent each side 15 includes side wing walls 36 which are spaced from the side walls 15 and are suitably secured to the side walls 28 of the core member 13 to retain the core member 13 in the shell 12. The wing walls 36 each includes an outwardly extending rear wall 37 which is suitably secured as by welding to the wall 15. The rear walls 37 are positioned in the rear of the side apertures 17 of the shell 12. (See Fig. 3.)

Spaced in the rear of the intermediate portion 22 of the core member I provide a wall 38 which extends from one wing wall 37 to the other and from the upper tank portion 20 downward below the top of the lower tank portion where it includes a downwardly and forwardly inclined portion 39 which is spaced below the bottom of the lower tank 21. The wing walls 36 extend from the upper tank portion 20 downward to the inclined portion 39. (See Fig. 2.) Intermediate the upper and lower tank portions 20 and 21 the wall 38 has a circular aperture 38' therein.

Approximately in the same plane with the upper surface of the lower tank 21 and intermediate the wall 38 in the tank 21, I provide a shutter member 40 which is pivotally mounted at the rear thereof on a rod 41 which is supported by the wing walls 36.

On the under side of the upper tank 20 I suitably mount a thermo-responsive arm 42 which is made of bimetal. The upper end of a rod 43 is pivotally connected to the arm 42 as at 44, and the lower end of the rod 43 is pivotally connected to the shutter 40 as at 45. The arm 42 is constructed so that when it is cool it is curved downwardly as shown in Fig. 2, and when it becomes heated it rises upward, thus it will be seen than when the arm 32 rises upward the rod 43 will move therewith and swing the shutter 40 upward.

In operation the return conduit 24 is suitably coupled as at 46 to the water jacket outlet conduit 47 of a water cooled engine 48 and the outlet conduit 25 of the radiator is suitably connected to the water jacket inlet conduit 49 of the engine 48. The radiator is positioned so that the fan 51 of the engine 48 is approximately positioned in the aperture 38' of the wall 38. When the radiator core 13 and the water jacket of the engine 48 are filled with water and the engine 48 is started, cooling air enters the shell aperture 16 and circulates around the front and sides of the radiator as shown by the arrows in Fig. 3.

When the temperature of the water in the radiator rises to a predetermined degree, the thermoresponsive arm 42 starts to move upward, thereby moving the shutter 40 upward through the medium of the rod 43 whereupon the engine fan 51 draws cooling air through the shell aperture 16. This air is directed upward by the inclined wall 39 past the shutter 40 and circulates over the rear of the intermediate portion 22, and is then drawn out of the core member 13 through the aperture 38' in the wall 38 and directed onto the engine 48.

When the engine 48 is stopped and the water in the radiator cools to a predetermined degree the thermoresponsive arm 42 moves downward and through the medium of the rod 43 swings the shutter 40 to a closed position.

From the foregoing it will be seen that when the cooling water is cold the shutter 40 is in a closed position and prevents the engine fan 51 from throwing cold air onto the motor, thus the motor will quickly heat to a running temperature, whereafter the thermoresponsive arm 42 actuates the shutter 40 to retain the cooling water in the motor at a suitable operating temperature. As the water circulates from the upper tank 20 downward through the intermediate portion 22 to the lower tank 21 the wire mesh members 32 and 33 absorb the heat of the water and the wire mesh member 32 conveys the heat to the front wall 26 and through the front wall to the mesh member 30 and as air circulates through the mesh member 30 it is cooled. At the same time the mesh member 33 conveys heat to the rear wall 27 and therethrough to the mesh members 34 and 35. Furthermore, the wire mesh members 32 and 33 form a tortuous passageway for the water to circulate through, thus thoroughly agitating the water as it circulates from the upper tank to the lower tank.

In Figs. 6, 7, and 8 I have indicated one of my improved radiators generally at 52. The radiator 52 is shown as operatively installed on the vehicle 53 wherein the vehicle engine 54 is positioned transversely of the longitudinal frame 55 of the vehicle. The radiator 52 is similar to the radiator 10 and like portions thereof are indicated by similarly primed reference numbers.

The radiator 52 is positioned with the front wall 26 thereof adjacent one side wall 56 of the vehicle 53 and as shown in Fig. 8 the wall 56 has a plurality of apertures 58 therein with vertical louvers 59 adjacent the rear of each of the apertures 58. The louvers 59 are inclined outwardly towards the front of the vehicle 53 so that when the vehicle is in motion they direct air through the apertures 58 onto the front wall 26 of the radiator 52.

The rear wall 60 of the vehicle has an aperture 61 therein for the emission of air.

Below the shutter 40' I provide an air scoop 62 which includes side walls 63 and 64 and a bottom wall 65. The bottom wall 65 is inclined downwardly towards the front of the vehicle 53 and takes the place of inclined wall 39 of the device 10. The inclined wall 65 of the device 52, like the inclined wall 39 of the device 10, directs air upward onto the rear of the intermediate portion 22' of the radiator when the shutter 40' is open. The operation of the radiator 52 is the same as previously described in connection with the radiator 10.

In Fig. 9 I have indicated an automobile generally at 70. The automobile 70 is of the streamlined type and includes a body portion 71 having sides 72 and a top 73 which at the rear is inclined downwardly to form a back portion 74. Furthermore, the automobile 70 is of the type wherein the engine is positioned at the rear of the passenger compartment and, as shown in Fig. 10, includes an engine 75 which, like the engine 54 shown in Fig. 6, is positioned transversely to the longitudinal axis of the automobile. Although shown as positioned transversely to the longitudinal axis of the automobile it is to be understood that my improved radiator may be also used in conjunction with an engine placed parallel to the longitudinal axis of the automobile. The engine 75 is preferably of the standard water cooled type.

In this type of automobile I preferably provide two of my improved radiators which I have indicated generally at 76 and 77. The radiators 76 and 77 are similar to the radiator 52 and like portions thereof are indicated by similarly primed reference numerals. The radiator 76 is positioned adjacent one of the sides 72 of the automobile body and the radiator 77 is positioned adjacent the other side.

Adjacent the radiators 76 and 77 each side 72 of the body 71 has an aperture 78 therein. The apertures 78 are of the same shape and area as the intermediate conduit portions 22″ of the radiators.

The radiators 76 and 77 are positioned with the outer mesh members 30″ thereof flush with the outer surface of the adjacent side wall 72 of the automobile body 71 as clearly shown in Fig. 10. The radiator 76 is shown as positioned adjacent the fan end of the engine 75 while the radiator 77 is at the opposite end of the engine and has the wall 38″ omitted therefrom. As shown in Fig. 10 the upper tank conduit 24″ of the radiator 76 and the upper tank conduit 24″ of the radiator 77 are connected by a conduit 79. The lower tank conduit 25″ of the radiator 76 communicates through a conduit 80 with the bottom of the engine water jacket, and the lower tank conduit 25″ of the radiator 77 communicates through a conduit 81 with the top of the engine water jacket.

When the engine 75 is operating the water circulation is from the lower tank 21″ of the radiator 76 through the conduits 25″ and 80 into the water jacket of the engine, thence out of the water jacket and through the conduit 81 and through the conduit 25″ of the radiator 77 into the lower tank 21″ of the radiator 77. From the lower tank 21″ of the radiator 77 the hot water rises through the intermediate conduit portion 22″ thereof into the upper tank 20″ thereof. From the upper tank 20″ of the radiator 77 the water flows through the conduit 24″ thereof and through the conduit 79 and the conduit 24″ of the radiator 76 into the upper tank 20″ thereof and thence downward through the intermediate portion 22″ into the lower tank 21″.

With this type of installation a portion of the rear wall 74 of the automobile body 71 is preferably hinged as indicated at 82 to form a door 83 in which a plurality of horizontal louvers 84 are provided for the passage of air from the engine compartment.

In Fig. 11 I have indicated a slightly modified form of construction of the intermediate conduit portion of my radiator generally at 85. As shown, the conduit portion 85 is formed similar to conduit portion 22 and includes spaced front and rear walls 86 and 87, and end walls 88. The front wall 86 is plane while the rear wall 87 is formed with a plurality of vertically extending crenelations 89, each of which includes spaced side walls 90 and a rear wall 91.

Positioned on the front wall 86 I provide a wire mesh member 92 which is formed in a serpentine shape. The wire mesh member 92, like the previously described wire mesh member 30 is of the type wherein the vertical and horizontal strands thereof are soldered together at their junctures.

Positioned between the front and back walls 86 and 87 I provide a pair of wire mesh members 93 and 94 which are formed in serpentine shape similar to the wire mesh member 92. The front interior mesh 93 is positioned so that the forwardly curved portions thereof contact the front wall 86 in the same line as the rear curved portions of the member 92 contact the front wall, and the member 94 is positioned so that the forwardly curved portions thereof contact the rear curved portions of the member 93, and the rear curved portions of the member 94 contact the rear wall 87.

Positioned in each of the crenelations 89 I provide a wire mesh member 95 which is similar to the other previously described mesh members, and between the crenelations I provide similar mesh members 96. The mesh members 95 extend from the inner surface of one side wall 90 to the inner surface of the opposite wall and the mesh members 96 extend from the outer surface of one side wall 90 of one crenelation to the outer surface of the side wall of the adjacent crenelation. The mesh members 95 and 96, like the mesh members 92 and 93, are positioned so that the adjacent curved portions thereof engage the same side wall 90 in the same line.

The mesh members 92, 93, 94, 95, and 96 are preferably secured in position in the same manner as previously described in connection with the wire mesh members of the device 10.

The distance between the inner surface of the front wall 86 and the inner surface of the rear wall 87 is preferably twice the distance between the inner surfaces of the side walls 90 of the crenelations and the distance between the crenelations is preferably the same as the distance between the inner surfaces of the side walls 90. With the conduit thus constructed, the size of the serpentine formation of all the mesh members 92, 93, 94, 95, and 96 is the same.

From the foregoing description it will be apparent that I have provided a novel water cooled radiator which is simple in construction and highly efficient in use.

Having thus described my invention I claim:

1. A radiator, said radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front wall of said conduit portion, said mesh member being in serpentine form, a mesh member positioned in said conduit, said second mesh member being in serpentine form, the crests of said second mesh engaging the front wall of said conduit portion approximately directly opposite the crests of said first mesh, a third mesh member positioned in said conduit, said third mesh member being in serpentine form with the crests thereof engaging the rear wall of said conduit and the valleys engaging the valleys of said second mesh member, said mesh members comprising cross wires soldered together and soldered to said conduit.

2. A radiator, said radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front wall of said conduit portion, said mesh member being formed in a serpentine shape, a mesh member positioned in said conduit, said second mesh member being formed in serpentine shape, the forwardly curved portions of said second mesh engaging the front wall of said conduit portion approximately directly opposite where the rearwardly curved portions of said first mesh engages the front wall of said conduit, a third mesh member positioned in said conduit, said third mesh member being formed in a serpentine shape with the rearwardly curved portions thereof engaging the rear wall of said conduit and the forwardly curved portions engaging the rearwardly curved portions of said second mesh member, a mesh member secured to the rear wall of said conduit, said rear mesh member being formed in serpentine shape with the forwardly curved portion thereof engaging the rear wall of said conduit.

3. A radiator, said radiator including an upper tank, an intermediate conduit portion and a lower tank, said conduit portion including front and rear walls, said rear wall of said conduit being formed with a plurality of vertically extending crenelations, said conduit portion at its upper end communicating with the interior of said upper tank and at its lower end communicating with the interior of said lower tank, a mesh member secured to the front wall of said conduit portion, said mesh member being in serpentine shape.

4. A radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front wall of said conduit portion, said mesh member being formed in a serpentine shape, a mesh member positioned in said conduit, said second mesh member being formed in a serpentine shape, the forwardly curved portions of said second mesh engaging the front wall of said conduit portion approximately directly opposite where the rearwardly curved portions of said first mesh engages the front wall of said conduit, a third mesh member positioned in said conduit, said third mesh member being formed in serpentine shape with the rearwardly curved portions thereof engaging the rear wall of said conduit and the forwardly curved portions engaging the rearwardly curved portions of said second mesh member, said rear wall of said conduit being formed with a plurality of vertically extending crenelations, mesh members secured to the side walls of said crenelated portions, said fourth mesh members being formed in serpentine shape, mesh members secured to the rear walls of said crenelated portions and said fifth mesh members being formed in crenelated shape.

5. A radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front and the rear of the front wall of said conduit portion, a mesh member engaging the rear wall of said conduit portion, said rear wall of said conduit being formed with a plurality of vertically extending crenelations and mesh members secured to the side walls of the crenelated portions.

6. A radiator, said radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured on the exterior of the front wall of said conduit portion, said mesh member being in serpentine form, a second mesh member positioned in said conduit, said second mesh member being in the rear of the front wall and being in serpentine form, a third mesh member positioned in said conduit, said third mesh member being on the front of the rear wall and in serpentine form, said mesh members comprising cross wires secured together and secured to said conduit.

7. A radiator, said radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front wall of said conduit portion, said mesh member being in serpentine form, a mesh member positioned in said conduit, said second mesh member being in serpentine form, the crests of said second mesh engaging the front wall of said conduit portion, a third mesh member positioned in said conduit, said third mesh member being in serpentine form and engaging the rear wall of said conduit, said mesh members comprising cross wires secured together and secured to said conduit.

8. A radiator, said radiator including an upper tank, an intermediate conduit portion and a lower tank, said conduit portion including front and rear walls, said conduit portion at its upper end communicating with the interior of said upper tank and at its lower end communicating with the interior of said lower tank, a mesh member secured to the front wall of said conduit portion, said mesh member being formed in a serpentine shape, a mesh member positioned in said conduit, said second mesh member being formed in a serpentine shape and engaging the front wall of said conduit portion, a third mesh member positioned in said conduit, said third mesh member being formed in a serpentine shape and engaging the rear wall of said conduit, a fourth mesh member secured to the rear wall of said conduit, said fourth mesh member being formed in serpentine shape.

9. A radiator including a housing having front and rear walls, a mesh member secured to the front of the front wall, a second mesh member arranged within the housing and a third mesh member engaging the rear wall of said housing, all of said mesh members being arranged in serpentine form with crests engaging the respective walls, said rear wall including crenelations.

WILLIAM A. NORRIS.